US010402067B2

(12) United States Patent
Behr et al.

(10) Patent No.: US 10,402,067 B2
(45) Date of Patent: Sep. 3, 2019

(54) BI-DIRECTIONAL SEARCH AND SORTING

(71) Applicant: Autodesk, Inc., San Rafael, CA (US)

(72) Inventors: Jay Allan Behr, San Francisco, CA (US); Aaron D. Munter, San Rafael, CA (US); Michael William Lollar, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 758 days.

(21) Appl. No.: 14/811,622

(22) Filed: Jul. 28, 2015

(65) Prior Publication Data
US 2016/0034150 A1 Feb. 4, 2016

Related U.S. Application Data

(60) Provisional application No. 62/032,382, filed on Aug. 1, 2014.

(51) Int. Cl.
| | |
|---|---|
| *G06F 3/048* | (2013.01) |
| *G06F 3/0484* | (2013.01) |
| *G06F 16/44* | (2019.01) |
| *G06F 3/0481* | (2013.01) |
| *G06F 3/0482* | (2013.01) |

(52) U.S. Cl.
CPC ........ *G06F 3/04845* (2013.01); *G06F 3/0482* (2013.01); *G06F 3/04815* (2013.01); *G06F 16/444* (2019.01); *G06F 3/04842* (2013.01); *G06F 2203/04806* (2013.01)

(58) Field of Classification Search
CPC ............. G06F 3/04845; G06F 3/04842; G06F 17/30061
See application file for complete search history.

(56) References Cited

U.S. PATENT DOCUMENTS

| | | | |
|---|---|---|---|
| 9,454,283 B1 * | 9/2016 | Torgerson | ........... G06F 3/04815 |
| 2004/0249809 A1 * | 12/2004 | Ramani | ............. G06F 17/30259 |
| 2008/0188969 A1 * | 8/2008 | O'Malley | ............... G06F 17/50 700/97 |
| 2009/0307255 A1 * | 12/2009 | Park | ....................... G06Q 10/10 |
| 2010/0198563 A1 * | 8/2010 | Plewe | ................. G06F 17/5004 703/1 |
| 2012/0246148 A1 * | 9/2012 | Dror | ....................... G06F 17/50 707/722 |

* cited by examiner

*Primary Examiner* — Ajay M Bhatia
*Assistant Examiner* — Mohamed Abou El Seoud
(74) *Attorney, Agent, or Firm* — Gates & Cooper LLP

(57) ABSTRACT

A method, apparatus, system, and computer program product provide the ability to search for and interact with three-dimensional (3D) objects in a 3D model/drawing. Searches may be conducted on a per object basis (based on properties of the object) and search queries may be amended based on shared/common attributes between objects found in an initial search. Differences in search results can be identified and the causality may be used to perform additional searches. Search results may be listed in a list view and a correspondence between objects in the list view and the modeling view may be visibly discernible. Further, selection of a single object from a search result may focus the view on such an object while removing any occluding objects. Multiple selected objects can be viewed in an array of rotationally synchronized viewports.

3 Claims, 16 Drawing Sheets

BI-DIRECTIONAL SEARCH AND SORTING

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/032,382, filed on Aug. 1, 2014, by Jay Allan Behr, Aaron D. Munter, and Michael William Lollar, entitled "Bi-Directional Search and Sorting,".

BACKGROUND OF THE INVENTION

1. Field of the Invention

The present invention relates generally to three-dimension (3D) modeling applications, and in particular, to a method, apparatus, and article of manufacture for interacting with and searching a 3D model.

2. Description of the Related Art

Many 3D modeling systems provide for and maintain 3D objects and 3D data in single and/or multiple files. However, prior art systems fail to easily and quickly provide efficient mechanisms for searching and finding particular objects/data.

SUMMARY OF THE INVENTION

Embodiments of the invention provide the ability for a user to easily/visually identify 3D objects/data that the user is searching for. Further, embodiments of the invention provide the ability to utilize found objects as a means for initiating or refining a query, and quickly associating a textual and visual representation of data, with the ability to toggle between views.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide various features including:

- Bi-Directional Interaction Between List View and Model Views;
  - including deep zoom functionality with the removal of occlusions;
- Search Query Amendments Based on Shared Properties;
- Searching as a Function of a Selected Object;
  - including one-click orthogonal searching and increased scope;
- Comparison View Mode (e.g., multiple camera/viewport synchronization; and
- Reverse Search Each of these features are described in detail herein.

Hardware Environment

Figure 1:
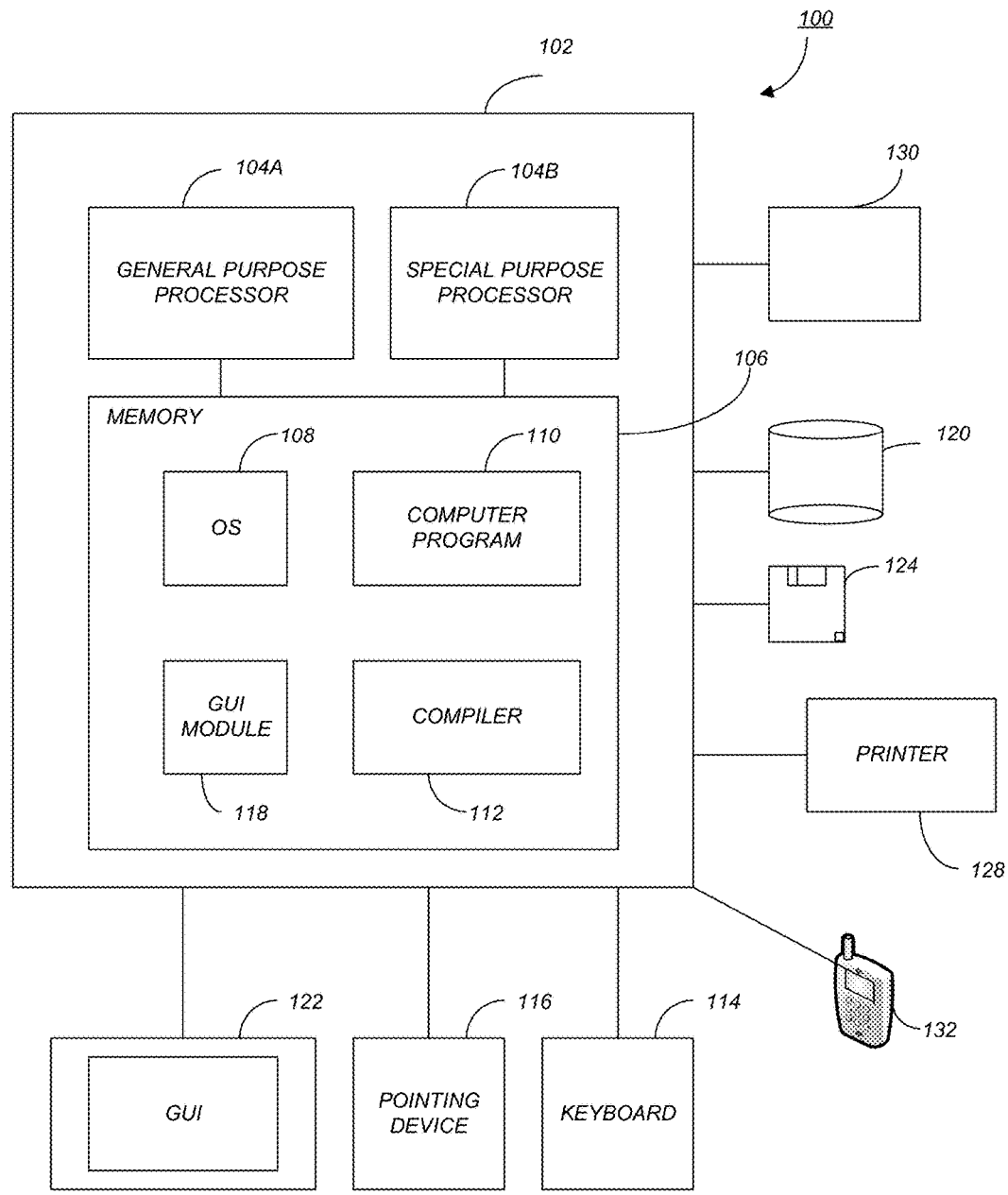
FIG. 1 is an exemplary hardware and software environment 100 used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
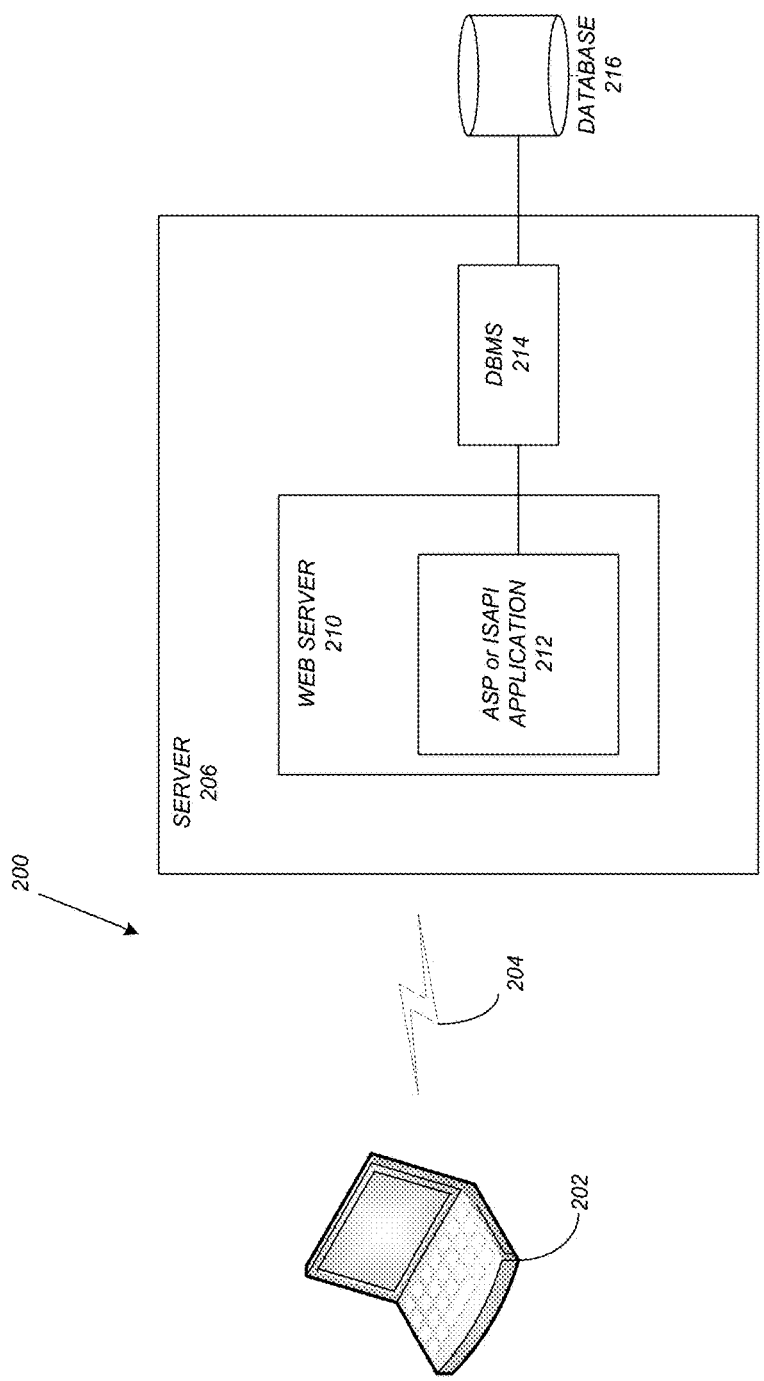
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Computer-Implemented Graphics Program

Figure 3:
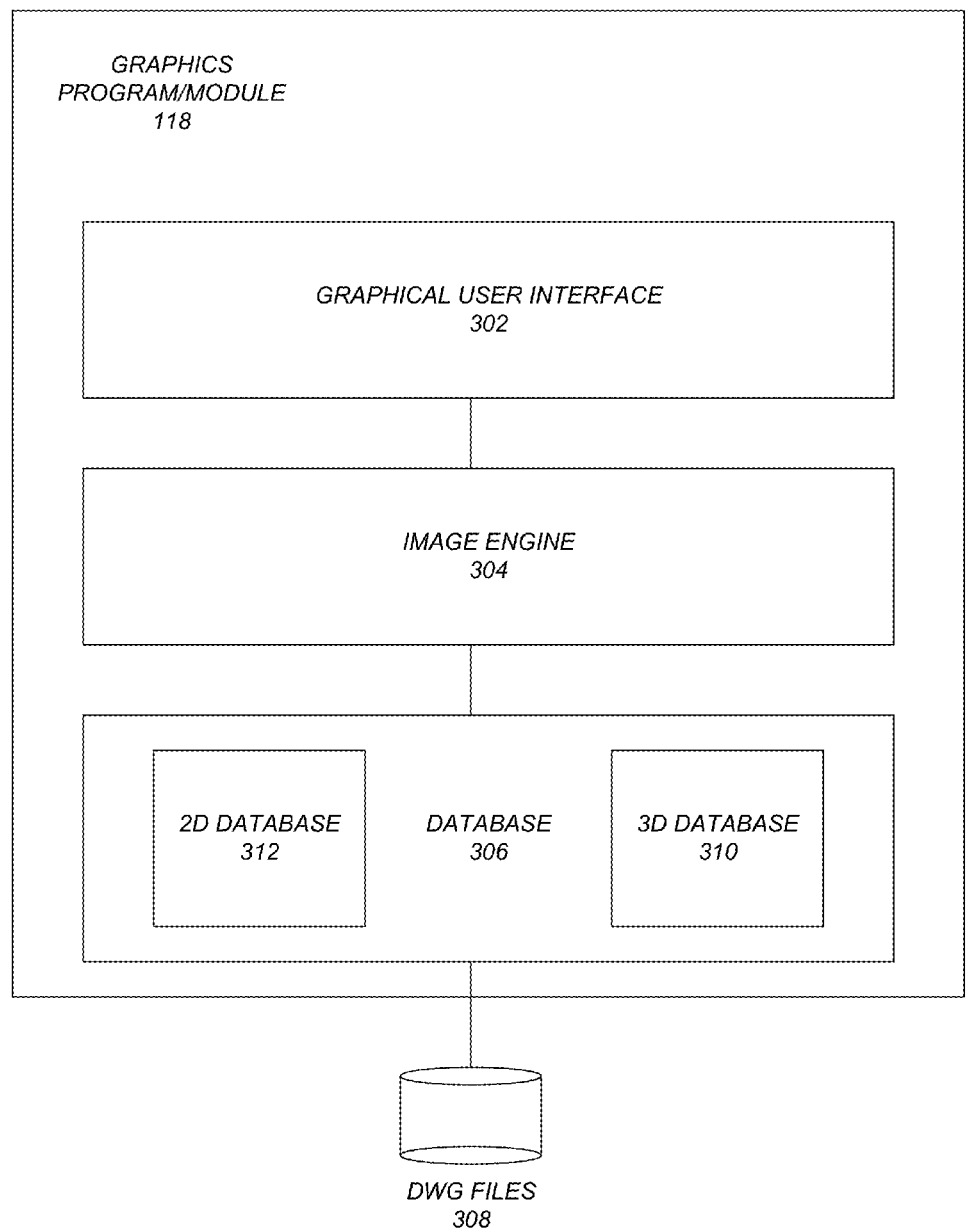
FIG. 3 is a block diagram that illustrates the components of the graphics program (of FIG. 1) in accordance with one or more embodiments of the invention.

FIG. 3 is a block diagram that illustrates the components of the graphics program 118 (of FIG. 1) in accordance with one or more embodiments of the invention. There are three main components to the graphics program 118, including: a Graphical User Interface (GUI) 302, an Image Engine (IME) 304, and a DataBase (DB) 306 (e.g., the database 216 of FIG. 2) for storing objects in Drawing (DWG) files 308.

The Graphical User Interface 302 displays information to the operator and provides the functionality for the operator's interaction with the graphics program 118.

The Image Engine 304 processes the DWG files 308 and delivers the resulting graphics to the monitor 122 for display. In one or more embodiments, the Image Engine 304 provides a complete application programming interface (API) that allows other computer programs to interface to the graphics program 118 as needed.

The Database 306 is comprised of two separate types of databases: (1) a 3D database 310 known as the "3D world space" that stores 3D information; and (2) one or more 2D databases 312 known as the "2D view ports" that stores 2D information derived from the 3D information.

Object List

Figure 4:
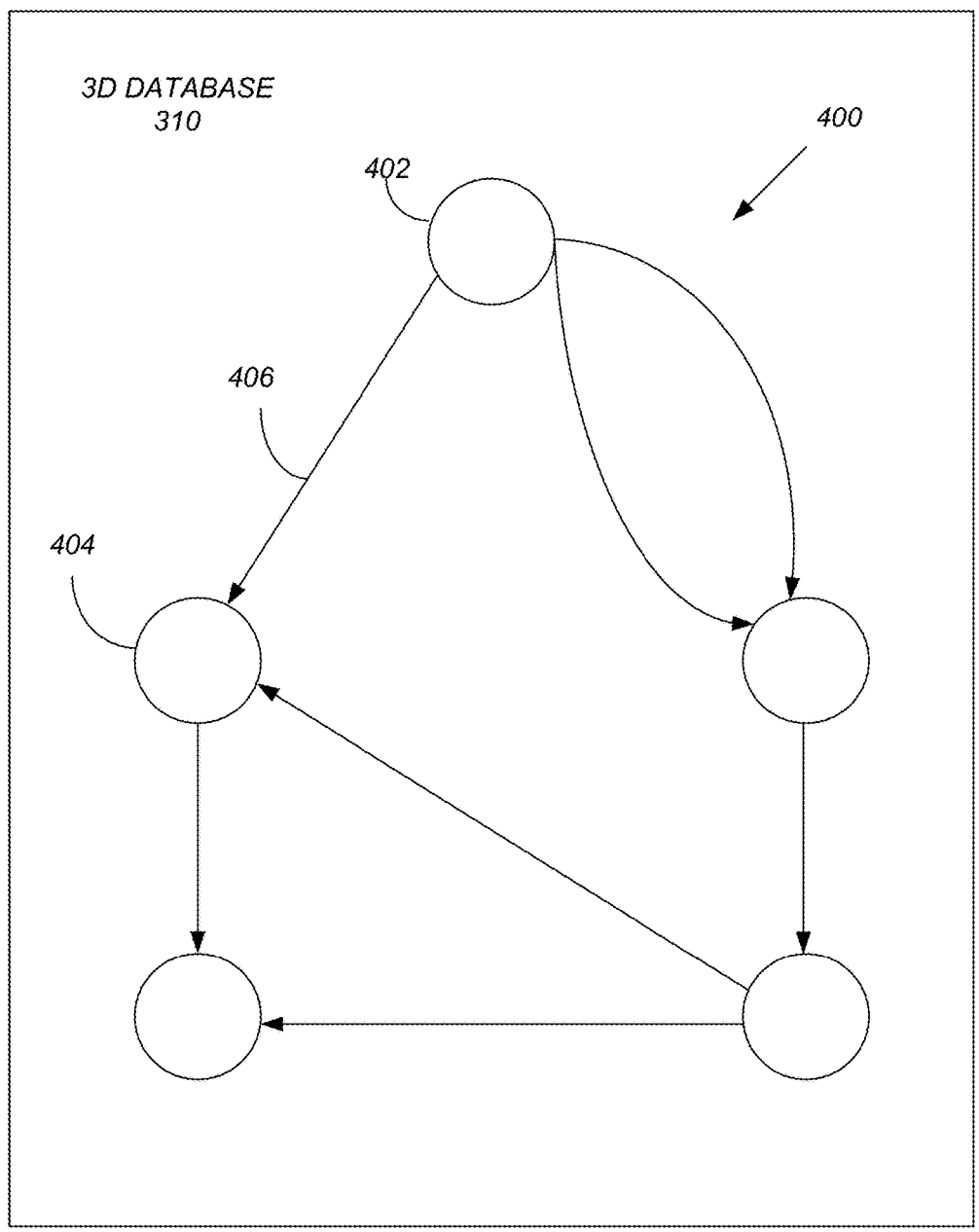
FIG. 4 is a block diagram that illustrates the structure of an object list maintained by the 3D databases in accordance with one or more embodiments of the invention.

FIG. 4 is a block diagram that illustrates the structure of an object list 400 maintained by the 3D databases 310 in accordance with one or more embodiments of the invention. The object list 400 is usually comprised of a doubly linked list having a list head 402 and one or more objects 404 interconnected by edges 406, although other structures may be used as well. There may be any number of different object lists 400 maintained by the 3D databases 310. Moreover, an object 404 may be a member of multiple object lists 400 in the 3D databases 310.

Such an object list 400 may represent the structure maintained by a 3D modeling system and/or computer aided drafting (CAD) system. In this regard, objects 404 may represent geometric objects, parts of an assembly model, a collection of points in 3D space (that may or may not be connected by various geometric entities), etc. Embodiments of the invention may be implemented in a solid modeling application, a CAD application, or any other computer graphics application capable of processing 3D objects.

Software Embodiment Details

Embodiments of the invention provide the capability to interact with and search a 3D model for one or more 3D objects. As an example, in a design phase of a project (e.g., a hospital), an architect may need to find all of the instances of swing doors across the project and ensure that such doors are replaced with consistent choices. Prior art systems fail to provide such capability. Various techniques and methods may be used to enable such features.

Bi-Directional Interaction Between List and Model Views

When conducting a search of a 3D model, various 3D objects/geometry may be found. A list palette may be displayed that contains the search results. Such a list palette may be placed anywhere desired within a graphical user interface. For example, the list palette may be placed off to the side in a 3D viewer (viewport) of a 3D model and may also show an icon/glyph/image of the 3D objects/geometry in 3D. Embodiments of the invention provide the ability to coordinate between the selection in the list view and a selection indication in the viewport.

Figure 5:
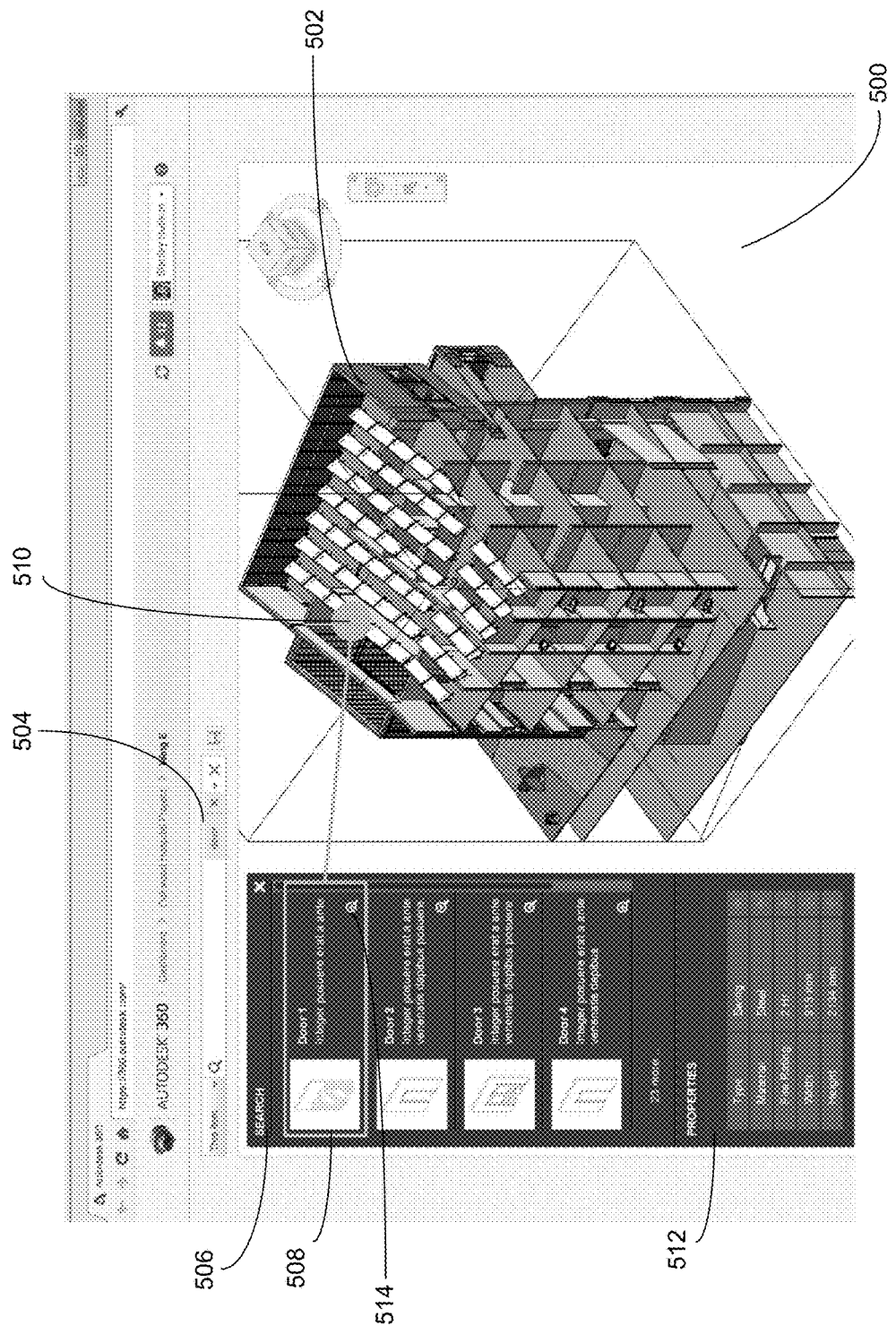
FIG. 5 illustrates the selection of an item/object in a list/palette view and the association of such a selected item/object with the object's location in the 3D model in accordance with one or more embodiments of the invention.

FIG. 5 illustrates the selection of an item/object in a list/palette view and the association of such a selected item/object with the object's location in the 3D model in accordance with one or more embodiments of the invention. The 3D model 502 is displayed in viewer 500. The search window 504 indicates that a search for doors has been conducted and the results of the search are displayed in list view/palette 506. Upon selection of an item/object 508 from the list view 506, the location of that item is highlighted 510 in the viewer 500. In one or more embodiments, all instances of the selected design item/object 508 may be highlighted 510 in the viewer 500 (i.e., on model 502). In addition, properties 512 for the selected item 508 may be displayed within the list/palette view 506.

Selection of a different item/object from list 506 may change the view (e.g., zoom, angle, etc.) to the appropriate view for that item. The user may also have the option of viewing any particular item closer. The user can opt to perform a deep zoom of a particular item by selecting an appropriate function (e.g., by selecting the magnifying glass 514). A deep zoom operation not only reorients the model but also the zoom of the selected item 508.

Figure 6:
FIG. 6 illustrates a resulting view once a deep zoom operation is performed on a selected item in accordance with one or more embodiments of the invention.

FIG. 6 illustrates a resulting view once a deep zoom operation is performed on a selected item in accordance with one or more embodiments of the invention. As illustrated, the user has selected the magnifying glass 514 associated with "Door 2." The resulting view in the view window 500 illustrates a zoomed view 602 of "Door 2" within viewer 500. The model 502 has been rotated and zoomed to the point that the selected item (i.e., "Door 2") consumes a majority of the viewport 500. In addition, any occlusion from the reoriented view of the selected object is removed such that the entirety of the selected object can be seen in the viewport 500. Such a removal of occlusions does not actually edit the model 502. Instead, within the viewport 500, all occluding objects are made transparent/translucent. Thus, based on the single selection of an object/zoom feature, embodiments of the invention will automatically zoom to the object and remove all occluding objects.

Figure 7:
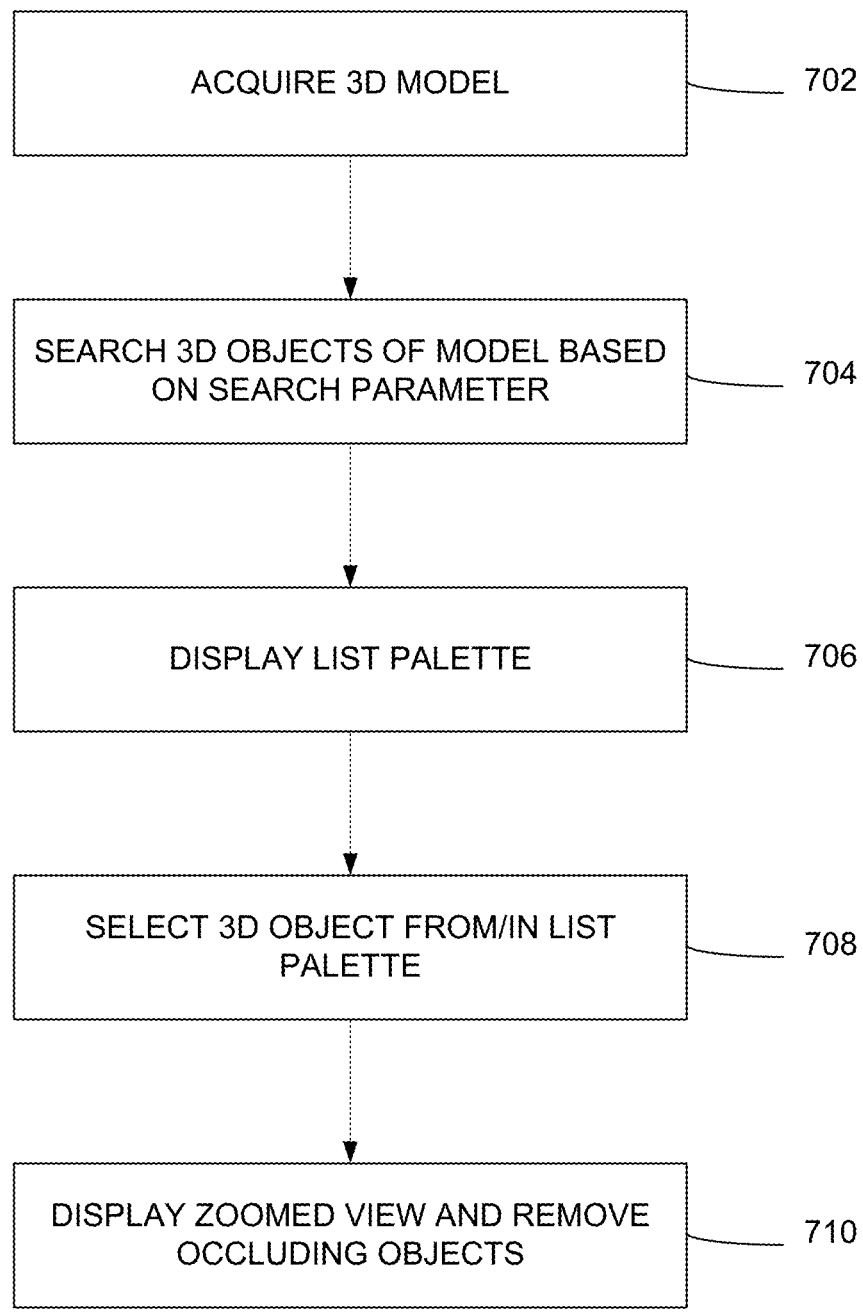
FIG. 7 illustrates the logical flow for performing an automatic zoom operation in accordance with one or more embodiments of the invention.

FIG. 7 illustrates the logical flow for performing an automatic zoom operation in accordance with one or more embodiments of the invention.

At step 702, a 3D model is acquired that consists of two or more 3D objects.

At step 704, the 3D objects in the model are searched based on an identified search parameter. The search parameter specifies a property value for a property of the 3D objects to be searched.

At step 706, a list palette is displayed. The list palette includes the results of the searching and is a list of each 3D object that has the identified property value/search parameter. The list palette may also include a 3D geometric view of each found 3D object.

At step 708, one of the 3D objects in the list palette (i.e., from the result list) is selected. Such a selecting may comprise a single click of a user input device.

At step 710, simultaneously with the list palette, a zoomed view of the 3D model is displayed (e.g., in response to a single click of the user input device). The zoomed view zooms in on the selected 3D object and removes any of the other 3D objects that occludes the selected 3D object without modifying the 3D model.

In view of the above, various functionality may be triggered from an item in a list of search results. Such functionality includes a change in the view orientation and controlling the visual representation of objects in a 3D scene in order to isolate an instance in a larger, occluding model. Thus, embodiments of the invention provide the ability to quickly identify a found element/object, and provide an optimal, in-context view of a selected item. In addition, embodiments provide the ability to control a list of objects from the object(s) in the model. Such a list can be reoriented (or repopulated) as a function of the orientation/zoom extents of a camera. Result sets can also be filtered as a function of the zoom operation. Alternatively, a result list can be scrolled based upon the orientation of the view.

Search Query Amendments Based on Shared Properties

Embodiments of the invention provide the ability to quickly amend search queries with property values based on multiple selected items/objects. The multi-selection of objects in a 3D canvas (or from a list) shows common or differing properties and allows the further quick revision of the search query based upon the addition of one or more of these properties.

Figure 8:
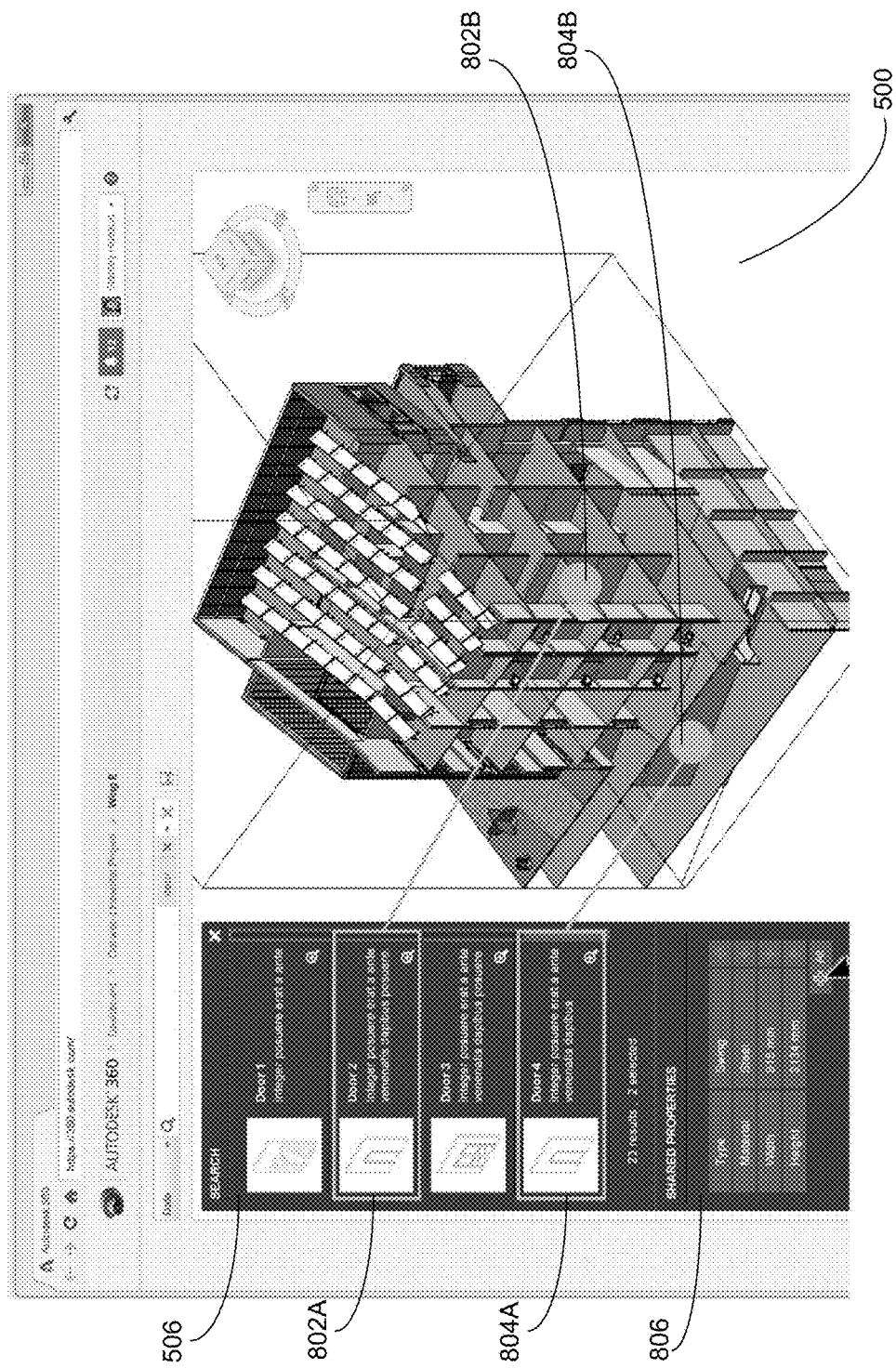
FIG. 8 illustrates the multiple selection of items in accordance with one or more embodiments of the invention.

FIG. 8 illustrates the multiple selection of items in accordance with one or more embodiments of the invention. In FIG. 8, the user has selected two items 802A and 804A from the list palette 506. The locations of the selected items 802A and 804A are highlighted 802B and 804B in the viewer 500. The selection of multiple items 802 and 804 enables various features including the display of properties in common/different between the selected items 802 and 804. FIG. 8 illustrates a display of shared properties 806 between objects 802 and 804. In other words, the parameters in the parameters pane 806 reduces to just the parameters that are in common to the two selected items 802 and 804.

Based on the shared properties 806, the user has the option to "show me all objects similar to these." Such an option may be invoked by selecting the "+" button adjacent any parameter or the "All" text to select all of the parameters. Once the appropriate selection of parameters has been conducted, the search may be automatically updated based on the added properties/parameters. In other words, the search query/filter conducted on the search is updated based on the newly selected parameter/properties.

Figure 9:
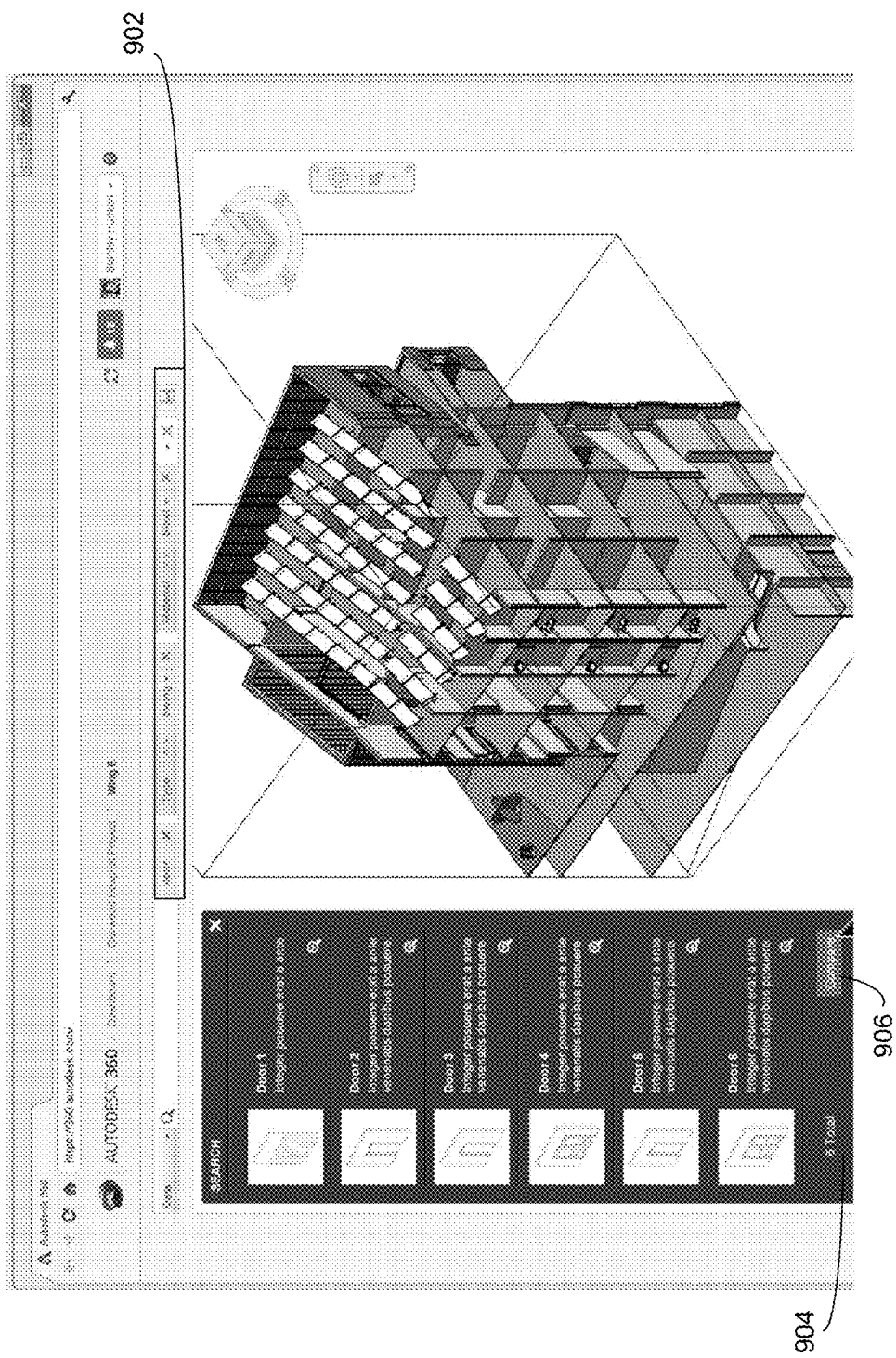
FIG. 9 illustrates the narrowed search based on the addition of the selected properties from FIG. 8 in accordance with one or more embodiments of the invention.

As an example, in FIG. 8, the initial search for "doors" retrieved twenty-three (23) results. Two of the doors 802A and 804A were selected. Out of the shared properties, the "swing" and "steel" parameters were added as filters to the query/search. FIG. 9 illustrates the narrowed search based on the addition of the selected properties from FIG. 8 in accordance with one or more embodiments of the invention. The name/value pairs added to the query are shown at 902. The search results have been reduced/narrowed from 23 to 6 (as shown at 904). The user also has the ability to compare selected items (e.g., by selecting "compare" button 906).

Figure 10:
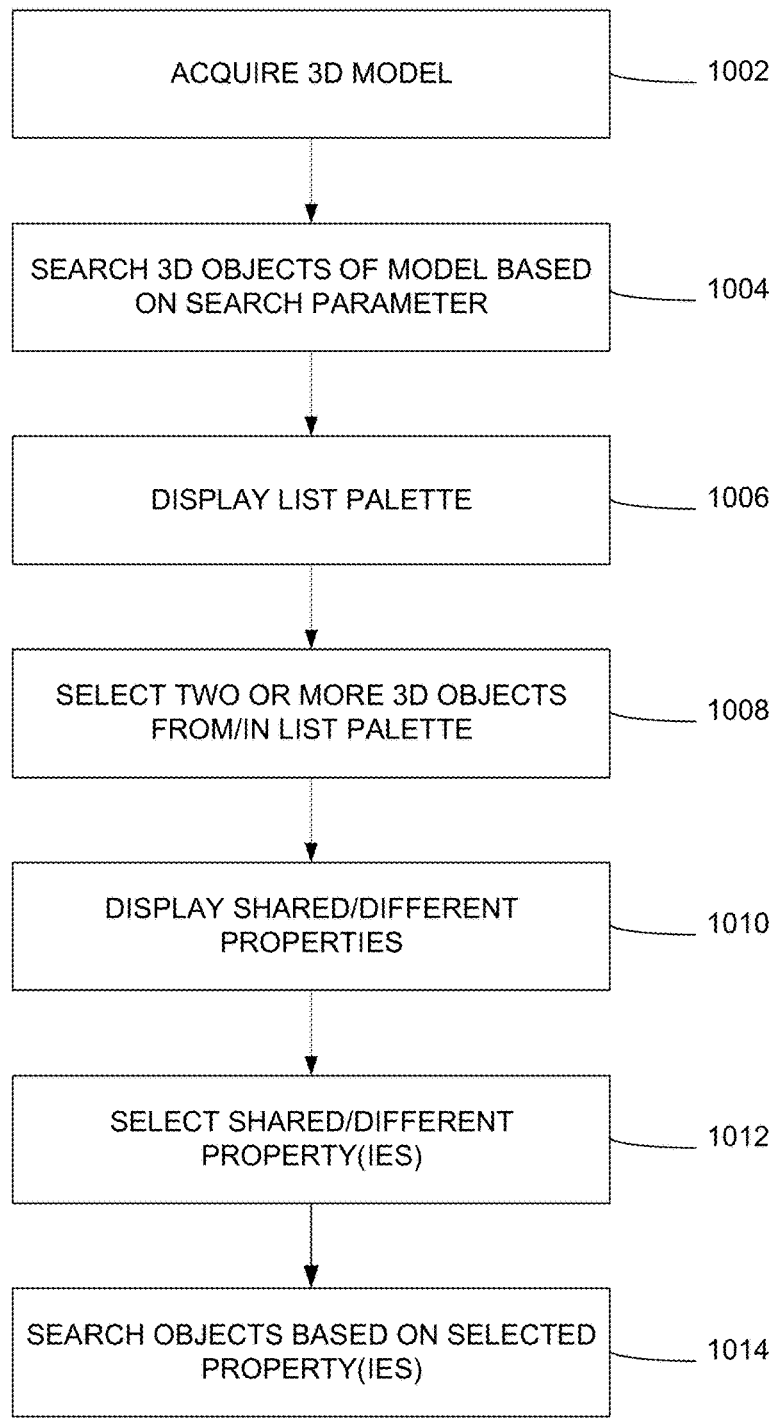
FIG. 10 illustrates the logical flow for quickly amending search queries in accordance with one or more embodiments of the invention.

FIG. 10 illustrates the logical flow for quickly amending search queries in accordance with one or more embodiments of the invention. Steps 1002-1006 are the same as steps 7002-7006 of FIG. 7.

At step 1008, two or more of the 3D objects in the list palette are selected.

At step 1010, a list of the shared properties (or different properties that distinguish/differentiate the selected items/objects) for the selected two or more objects are displayed.

At step 1012, one or more of the shared/differing properties are selected (e.g., using a single click of an icon such as a "+" button adjacent a parameter or "All" to select all shared/differing properties).

At step 1014, the search is updated/amended based on the selected properties. In other words, the 3D objects in the model are searched based on the selected properties. The updated/amended search may widen the scope of the search or may narrow the scope of the search.

As an alternative, or in addition to the above, objects/elements within a drawing/model may be searched based on attributes and a tolerance within those attributes. For example, a search may be conducted for doors of a particular dimension, as well as those doors within a 6' height or width of the particular dimension (or from a particular manufacturer, or made from a certain material).

Search as a Function of the Object

Figure 11:
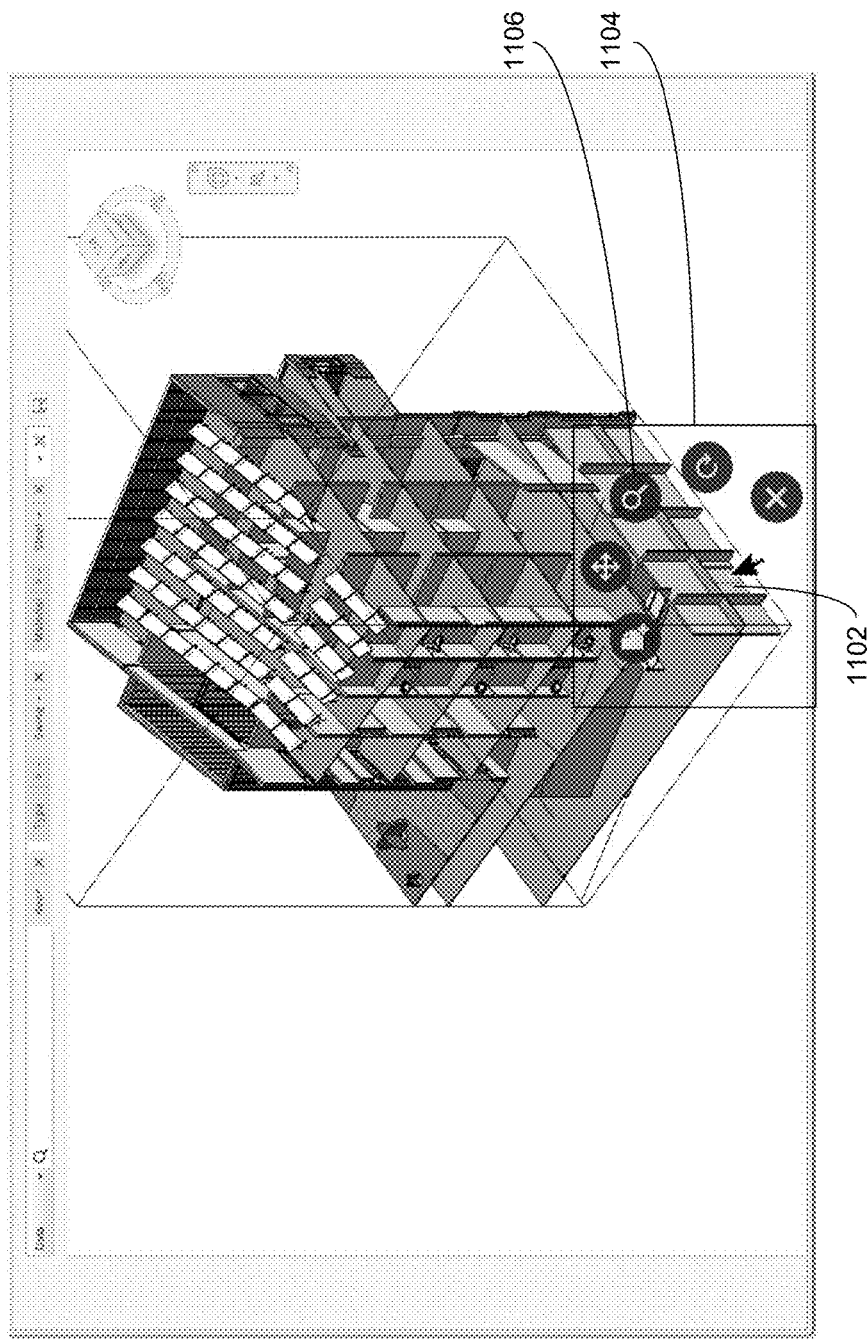
FIG. 11 illustrates the different options available from the context of an item the user has navigated to in accordance with one or more embodiments of the invention.

Just as users can navigate to an item from the context of a query, users can also query from the context of an item they have navigated to. FIG. 11 illustrates the different options available from the context of an item the user has navigated to in accordance with one or more embodiments of the invention. The user has navigated to door 1102 and right clicked the mouse button/cursor control device to activate the contextual radial menu 1104 for the instance of the door 1102. Based on the contextual radial menu 1104, various icons/buttons/glyphs allow the user to perform various functions.

By selecting the search icon 1106, a search on the selected item 1102 may be conducted. Such a search may extend beyond a mere simple search. The search is based on the properties of the selected object 1102 (both within and between documents) as well as orthogonal searches by object properties within a document. Such a search may perform multiple searches with the results sorted in groups. For example, the activation (via a single click) of the search option may perform three or more different searches that may include one or more of the following:

(1) for all instances of the selected object 1102 within the model;

(2) for all instances of the selected object 1102 within the larger domain that contains the model; and (3) based on properties of the selected object 1102, search orthogonally of the properties that are important to the user (with such importance computed based on various methodologies).

Figure 12:
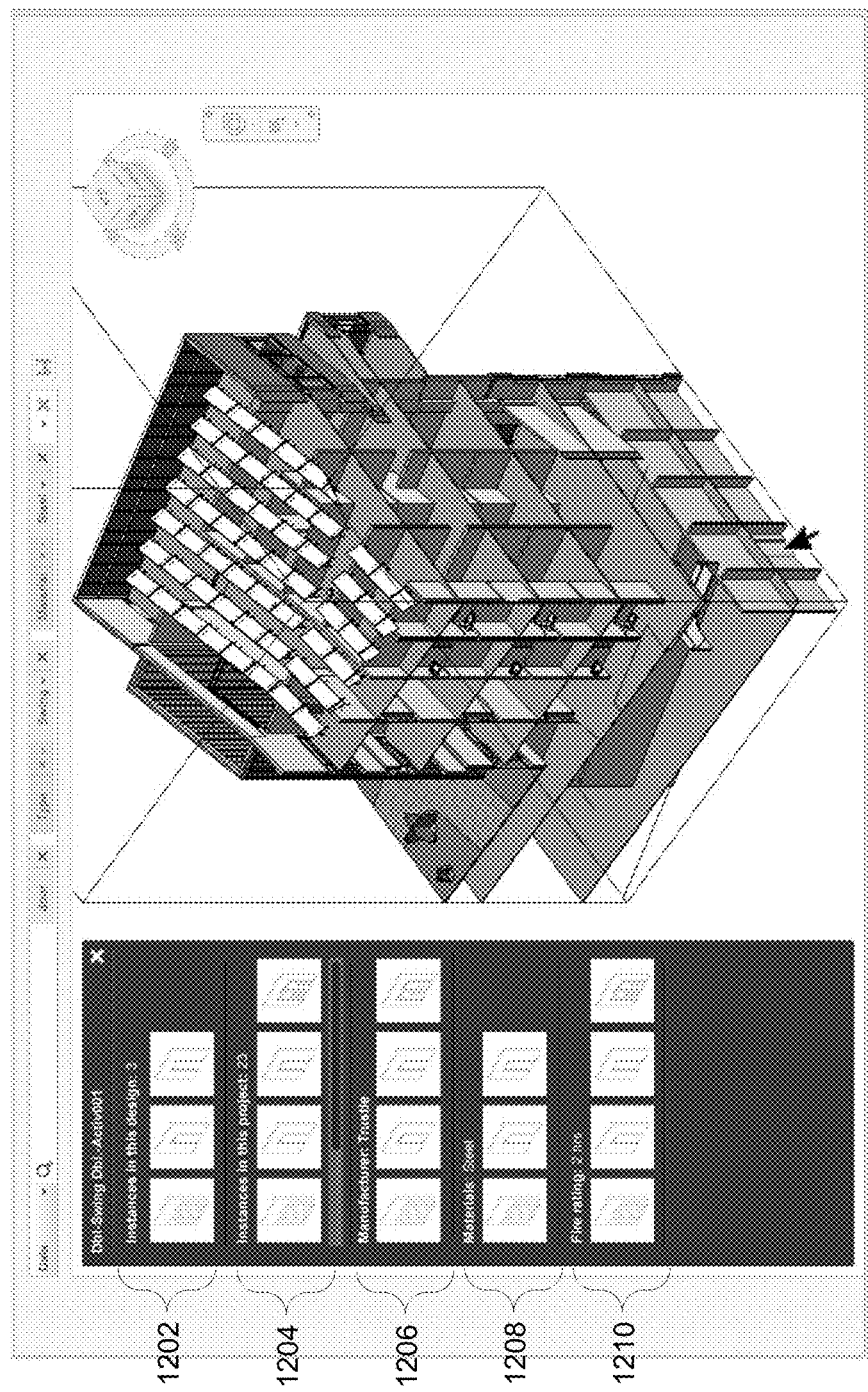
FIG. 12 illustrates search results conducted as a function of a selected object in accordance with one or more embodiments of the invention.

FIG. 12 illustrates search results conducted as a function of a selected object in accordance with one or more embodiments of the invention. The first row 1202 of the search results shows instances of the selected object within this model/design. The second row 1204 of the search results shows instances of the selected object in a larger domain than the model (e.g., within the project, hub, or other larger construct). In the example illustrated in FIG. 12, three (3) instances of the selected door were found in the design (row 1202) and 23 instances of the door were found in the project (e.g., the city).

In addition, rows 1206-1210 illustrate an automatic search that is performed orthogonally on the properties of the selected object. Row 1206 illustrates search results based on the manufacturer property (e.g., Trustle), row 1208 illustrates search results based on the material property of the selected object (e.g., Steel), and row 1210 illustrates search results based on the fire rating property of the selected object (e.g., 2 hrs).

One or more properties of the selected object may be searched. Alternatively, all objects of the selected property may be searched. Determining which properties should be searched and/or displayed may be based on a variety of factors. Such factors are used to determine which properties are important to the user. Importance is often determined in two different ways: (1) based on prior usage/conduct; and (2) based on user role/permissions.

When determining importance based on prior usage/conduct, embodiments of the invention may longitudinally study how a user has used the search tools in the past over time. For example, if the user has only carried about materials in the past, default search parameters may be based on material. Accordingly, initial/early usage by the user of the search tool may commence by showing all properties/parameters. Over time, the search parameters may become more focused/customized based on the user's conduct (e.g., if always select materials, future searches may limit search results to such materials).

When determining importance based on role (e.g., the user's identification, role, title, permission level, user level authorization, etc.), the user's role may be used to search/display particular parameters. For example, if the user role is identified as an industrial engineer, parameters such as the structure and materials may be searched/displayed while the manufacturer information may not be searched/displayed.

Further to the above, in addition to selecting particular properties to be searched/displayed, the domain searched may also be selected based on importance to the user (e.g., a domain smaller than the model such as the single floor the user has access to, or a project based domain, city based domain, etc.).

Figure 13:
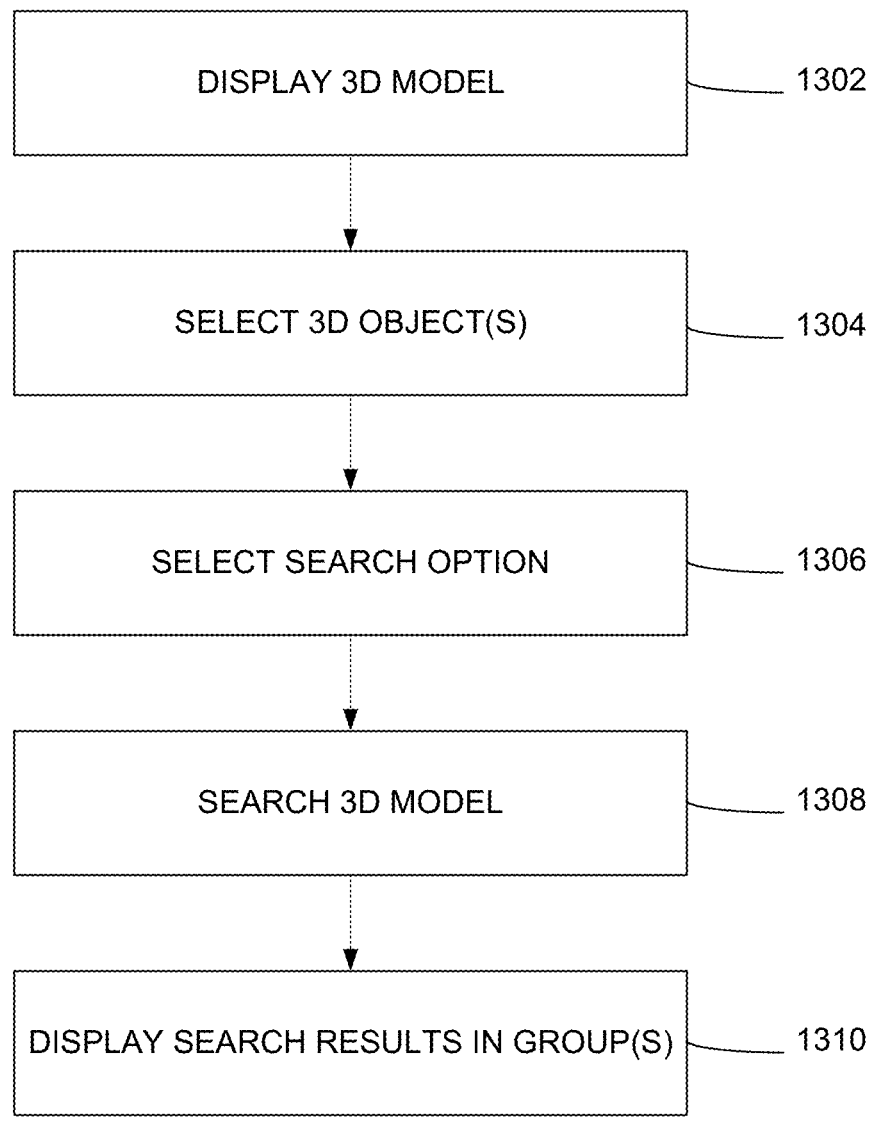
FIG. 13 illustrates the logical flow for performing searches as a function of an object in accordance with one or more embodiments of the invention.

FIG. 13 illustrates the logical flow for performing searches as a function of an object in accordance with one or more embodiments of the invention.

At step 1302, a 3D model (that consists of two or more 3D objects) is displayed.

At step 1304, one of the 3D objects is selected.

At step 1306, a search option is selected based on the selected object (e.g., right clicking on an object and single clicking a search option).

At step 1308, in response to the selection of the search option the 3D model is searched for all instances of the selected 3D object. In addition, in response to the selection of the search option, a domain containing the 3D model may also be searched. Also in response to the selection of the search option, an orthogonal search of various properties may be searched. Such a search includes identifying/determining the properties of the selected 3D object to be searched, and searching the model for objects having the identified/determined properties. The properties to be searched may be identified/determined based on importance to the user as determined by prior user interaction and/or user role.

At step 1310, the results of the search are displayed (e.g., on a monitor/display device). All found instances of the selected 3D object are displayed together in a group(ing). Further, if the domain is also searched, the search results display instances found within the domain in a second group(ing). In addition, if an orthogonal search of identified properties is conducted, the search results may include a third group(ing) in which the objects having such properties are listed.

Comparison View Mode

Embodiments of the invention provide the ability to select multiple found elements (e.g., from search results), select a comparison/viewing option, and display the selected elements/items/objects isolated and laid out in multiple viewports with synchronized camera angles/views. Once displayed in the comparison view mode, all of the viewports may be synchronized such that the rotation of one element/item/object rotates all of the other elements as well. However, such a rotation does not rotate the elements within the model but merely the individual isolated viewport containing the item. Accordingly, the data of the object itself is not modified.

As an example, a user may be interested in multiple parts of an assembled engine. By the selection of a single button, the user can maintain the assembled parts in the engine but view each of the parts in multiple orderless viewports such that each part may be individually examined and compared to other parts. The camera angle with which each part is viewed may be synchronized such that when one part is rotated, the other parts are rotated as well. Alternatively, the synchronization feature may be disabled for one or more of the individual viewports. When disabled, synchronized rotation may be not be performed and a single object may be rotated individually without rotating the other parts. Thereafter, synchronization can be enabled again such that any future rotations are synchronized.

Figure 14:
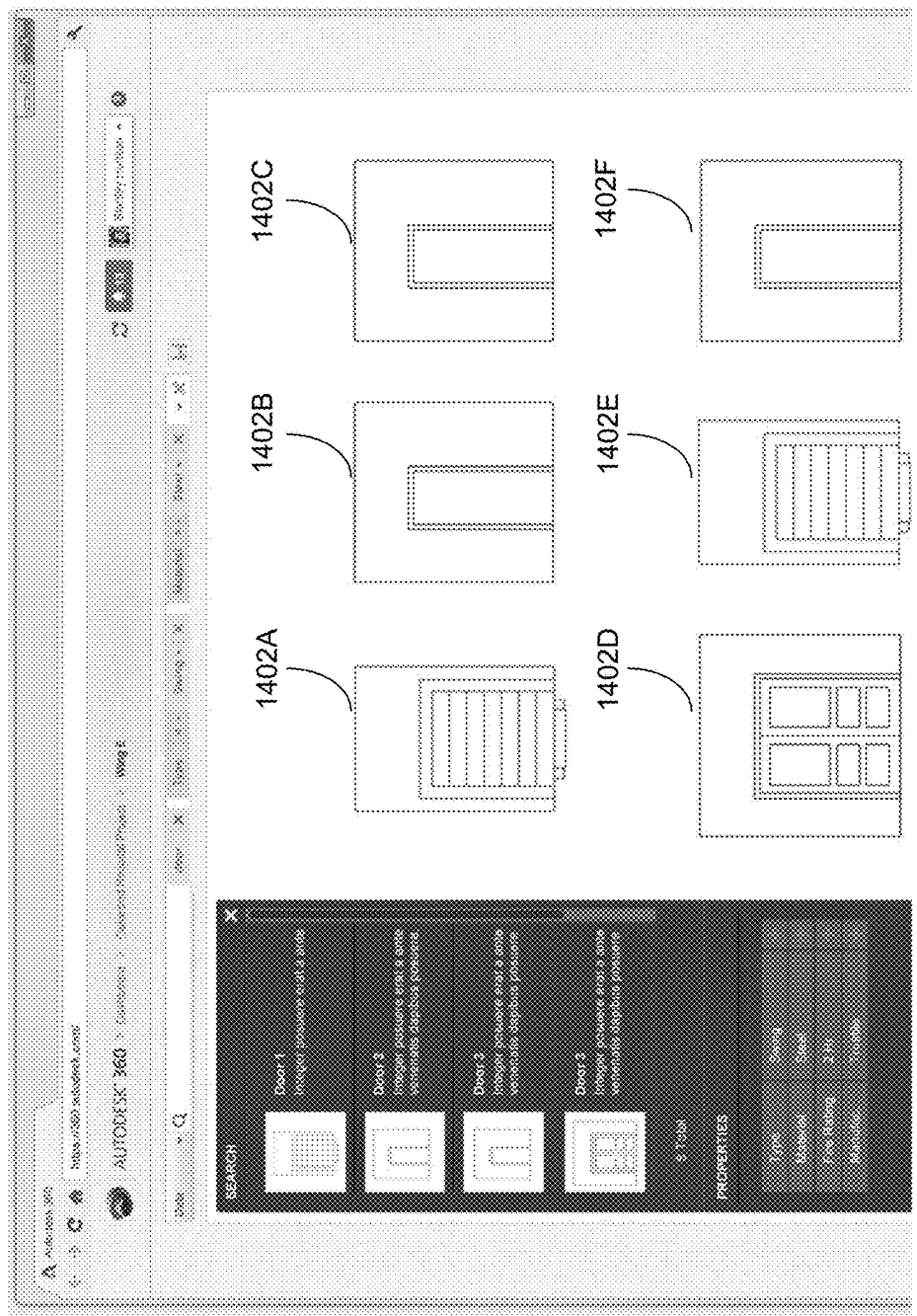
FIG. 14 illustrates a comparison view of multiple selected elements/items/parts in accordance with one or more embodiments of the invention.

FIG. 14 illustrates a comparison view of multiple selected elements/items/parts in accordance with one or more embodiments of the invention. Each of the selected objects found in the search results are displayed separately in synchronized viewports 1402A-1402F. Such a search may be saved and the user may be notified when a new item/object has been added that matches the search criteria (e.g., via an activity stream, email, SMS message, etc.).

Figure 15:
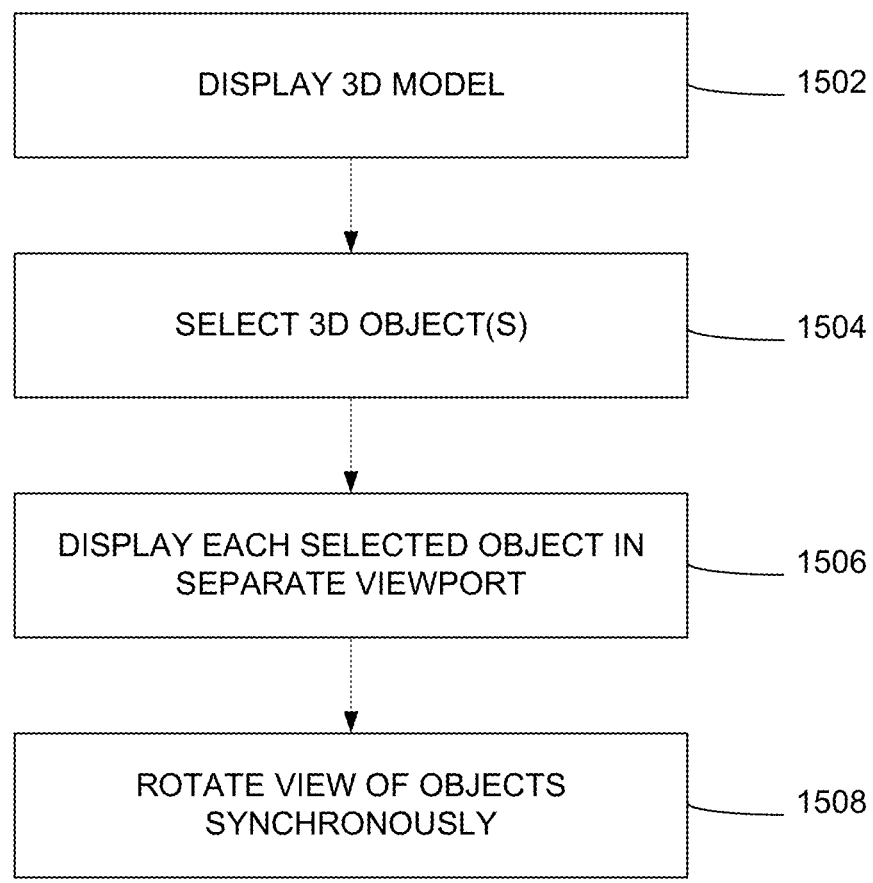
FIG. 15 illustrates the logical flow for interacting with multiple objects via rotationally synchronized viewports in accordance with one or more embodiments of the invention.

FIG. 15 illustrates the logical flow for interacting with multiple objects via rotationally synchronized viewports in accordance with one or more embodiments of the invention.

At step 1502, the 3D model (comprised of two or more 3D objects) is displayed.

At step 1504, two or more of the 3D objects are selected.

At step 1506, each of the selected 3D objects is displayed in a separate viewport.

At step 1508, the view, in the separate viewport, of one of the selected 3D objects is rotated. Such a rotation, synchronously rotates, in the separate viewports, all of the selected 3D objects without modifying the 3D objects. Further, as described above, the synchronized rotation option may be turned off/disabled such that when one of the object is rotated, the other objects are not rotated.

In view of the above, embodiments of the invention provide the ability to isolate multiple 3D objects into an array of synchronized viewports for visual comparison. Objects can be selected from a textual list (e.g., a list of search results) or from multiple selected objects in a 3D scene. One trigger action isolates the objects each in their own viewport. Each viewport is controlled synchronously from one camera interface (e.g., a viewcube). The view angle and visual representation of all of the viewports can be controlled together (or separately). This enables very detailed and dynamic visual comparison of 3D graphical elements. Such capability may be viewed as each part is being viewed with a separate camera, wherein when one camera moves, all of the other cameras are moved simultaneously/synchronously with respect to their respective object/part. However, the actual object is not being rotated within the model and that data for the part is not being modified.

Reverse Search

Users may have the ability to search for particular elements/objects and save those searches. Searches may be conducted (automatically on a scheduled trigger or manually) on a regular basis (e.g., once a day/week) with differing search results. Embodiments of the invention may provide the capability to determine what caused the change/delta in the search results and utilize such a delta to conduct additional searches. Such an additional search may be associated with/related to the original search (e.g., as a child).

For example, suppose that search A returns 5 results (e.g., 5 doors) for three weeks in a row. However, in week 4, search A only returns 2 results. Embodiments of the invention determine what caused the difference in the search results (e.g., one door was changed to wood and the other three doors were walled up). A new/amended search may then be conducted for all objects having that delta (e.g., all doors that were walled up and/or changed to wood). Alternatively, or in addition, a report may be generated that identifies what caused the delta and/or what other objects have the same/similar delta (e.g., within a threshold).

Figure 16:
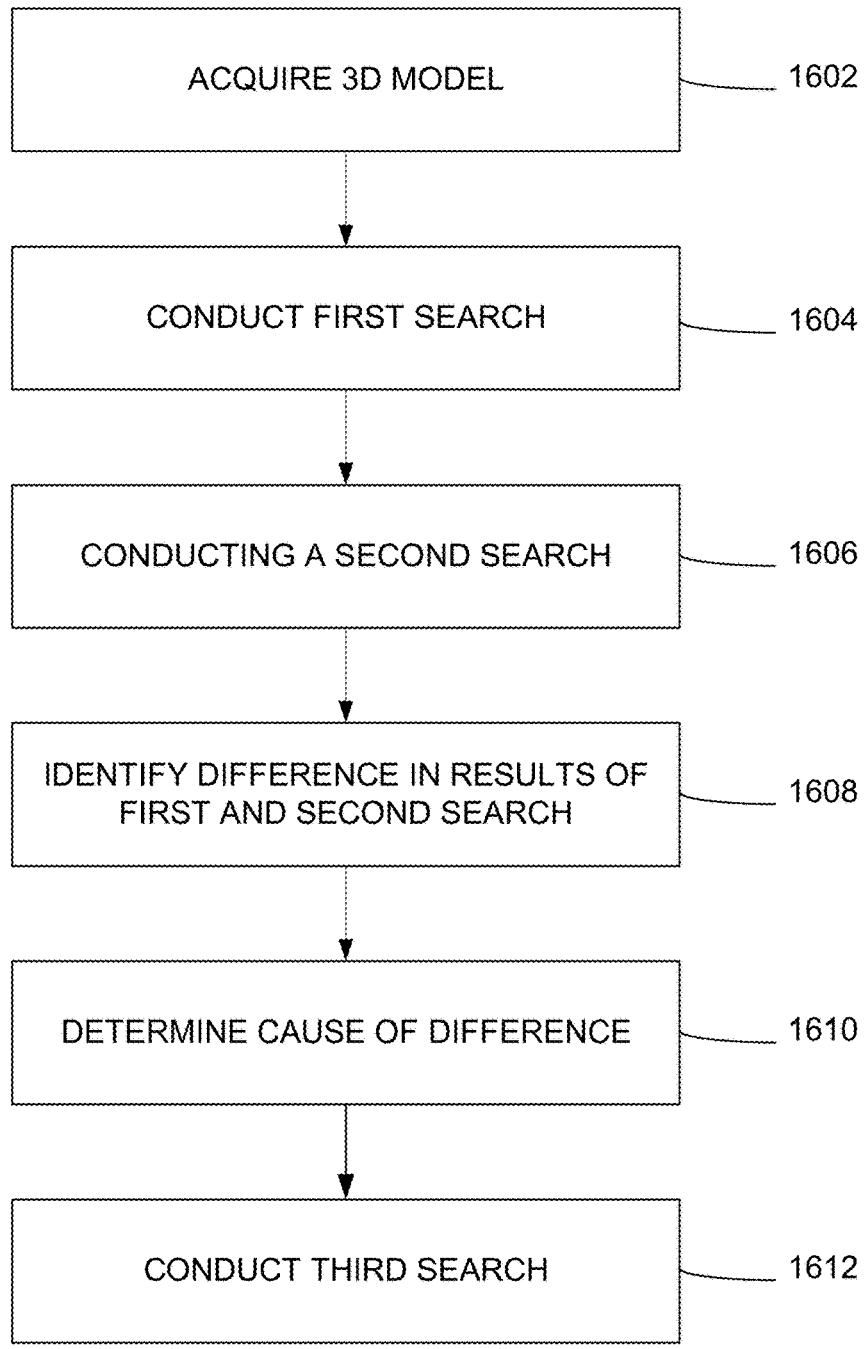
FIG. 16 illustrates the logical flow for conducting a search based on a change in search results in accordance with one or more embodiments of the invention.

FIG. 16 illustrates the logical flow for conducting a search based on a change in search results in accordance with one or more embodiments of the invention.

At step 1602, the 3D model (comprising two or more 3D objects) is acquired.

At step 1604, a first search of the 3D objects is conducted. The first search is based on an identified search parameter (or set of parameters) that specifies a property value for a property of the 3D objects.

At step 1606, a second search of the 3D object is conducted based on the same identified search parameters (i.e., the first search is repeated).

At step 1608, a difference in the results of the two searches is identified.

At step 1610, the cause for the difference in the search results is determined. Such a cause may be a change in a property of one or more of the 3D objects (e.g., from a first value to a second value) (e.g., a change in a material of an element).

At step 1612, a third search is conducted of the 3D objects based on the determined cause. For example, the search may comprise searching for objects having a property whose value changed from a first value to a second value. Alternatively, the search may be conducted for any objects whose had a change in a particular property (e.g., a manufacturer or material has changed, regardless of the particular value).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for interacting with a three-dimensional (3D) model, comprising:

acquiring the 3D model comprised of two or more 3D objects;

searching the two or more 3D objects based on an identified search parameter, wherein the identified search parameter specifies a property value for a property of the two or more 3D objects;

displaying a list palette comprised of results of the searching, wherein the list palette comprises a list of each 3D object of the two or more 3D objects having the property value;

selecting a first 3D object of the 3D objects in the list palette, wherein the 3D model comprises multiple instances of the first 3D object;

upon the selecting, highlighting all of the multiple instances of the first 3D object in a viewport containing a view of the 3D model, wherein the view of the 3D model is simultaneously displayed with the list palette;

selecting a zoom operation for a second 3D object of the 3D objects in the list palette; and displaying, in the viewport, on a display device, simultaneously with the list palette, a zoomed view of the 3D model, wherein the zoomed view zooms in on the selected second 3D object and removes any of the other 3D objects that occludes the selected 3D object without modifying the 3D model.

2. The computer-implemented method of claim 1, wherein the list palette further comprises a 3D geometric view of each 3D object.

3. The computer-implemented method of claim 1, wherein:
   the selecting comprises a single click of a user input device; and
   the displaying is performed in response to the single click.

* * * * *